Jan. 30, 1934.  A. A. KNEE  1,945,318
COMBINED PREVENTIVE MEANS FOR CHECK CONTROLLED APPARATUS
Filed March 5, 1930  7 Sheets-Sheet 1

A.A. KNEE,
INVENTOR

BY Powell S Eaton
ATTORNEY

A. A. KNEE,
INVENTOR

BY *Powers Eaton*
ATTORNEY

Jan. 30, 1934.  A. A. KNEE  1,945,318
COMBINED PREVENTIVE MEANS FOR CHECK CONTROLLED APPARATUS
Filed March 5, 1930  7 Sheets-Sheet 5

Patented Jan. 30, 1934

1,945,318

UNITED STATES PATENT OFFICE 1,945,318

COMBINED PREVENTIVE MEANS FOR CHECK CONTROLLED APPARATUS

Aaron A. Knee, Charlotte, N. C., assignor to Vanak Corporation, Charlotte, N. C., a corporation of North Carolina Application March 5, 1930. Serial No. 433,460

31 Claims. (Cl. 194—97)

This invention relates to fraud preventive devices for check controlled apparatus, and more especially to a fraud preventive device having a combination of means for successively and in combination detecting checks other than genuine and rejecting them, and returning the same to the depositor of the check.

An object of my invention is to provide a fraud preventive device comprising a check controlled apparatus, in which a plurality of means are provided for scrutinizing the configuration of the check and also the weight of the check, and if said check is not genuine both as to weight and configuration the same will be rejected by my fraud preventive means.

Another object of my invention is to provide a fraud preventive device adapted to be associated with check controlled apparatus, said fraud preventive device comprising a plurality of means working in combination to detect checks other than genuine, and to return said checks to the exterior of the machine, without delivering the same to the check controlled apparatus for operating the same.

Another object of my invention is to provide a check controlled device which is adapted to be associated with a check controlled vending machine, or any machine which is adapted to be operated by coins, checks and the like, in which means are provided for detecting irregularities in the checks, both as to surface configuration and as to weight, and my fraud preventive device comprises first a device for operating certain mechanisms by the configuration of the check, and then passing the check on through my fraud preventive device to certain weighing or balancing means, which are adapted to be so adjusted as to receive said checks, and if the check is not genuine to cooperate with the other features of my device, so as to reject the check and to return it to the exterior of the machine if not genuine, and to receive the check and direct it into the check controlled apparatus with which my fraud preventive means are associated if the check is genuine.

Another object of my invention is to provide a fraud preventive device for check controlled apparatus, in which means are adapted to be operated by the configuration of the check, not only as to its surface configuration on the side, but also in which the check must be of a given diameter in order to successfully pass the test of my fraud preventive means, and also said check must have a given weight in addition to certain face configurations and a certain diameter in order to be received by the fraud preventive device and passed on into the check controlled apparatus.

Some of the objects of my invention having been stated other objects will appear as the description proceeds, when taken in connection with the accompanying drawings, in which—

Figures 8, 11, 12, 13, 14, 15, 16, 17:
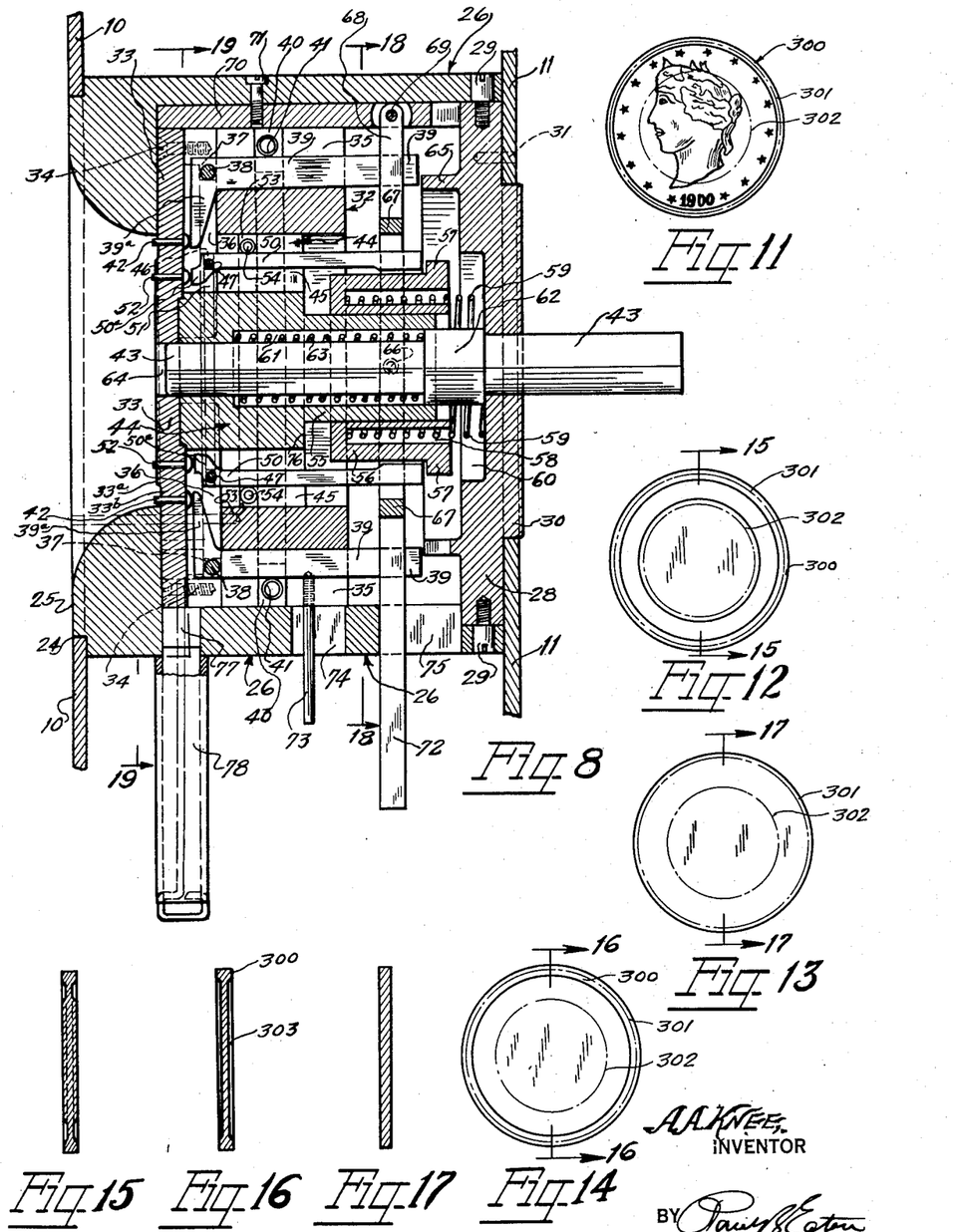
Figure 8 is a longitudinal cross-sectional view of the cylindrical means and taken along the line 8—8 in Figure 1.
Figure 11 is a side elevation of one form of check, this check representing a five cent piece of American money.
Figure 12 is a face view of a check of another form.
Figure 13 is a face view of a different type of check from the one previously shown.
Figure 14 is a face view of another type of check having a bevel around the edge thereof.
Figure 15 is a cross-sectional view taken along the line 15—15 in Figure 12.
Figure 16 is a cross-sectional view taken along the line 16—16 in Figure 14.
Figure 17 is a cross-sectional view taken along the line 17—17 in Figure 13.

Referring more specially to the drawings the numeral 10 represents one of the side plates for supporting my mechanism, and the numeral 11 indicates the other side plate. These side plates are secured together by any suitable means such as spacng members 12, 13, 14 and 15, which span the distance between the side plates and hold the same in separated position, and holes are provided in the side plates through which screws 16, 17, 18, 19, 20, 21, 22 and 23 project and are threadably embedded in the spacing members to provide a strong framework in which my mechanism is supported. It is understood that this framework may be of any suitable material, shape or size to conform to any check controlled apparatus with which it is built to operate. In the drawings I show a hole 24 in the upper left hand corner of side plate 10, this hole 24 is adapted to receive the front portion 25 of the cylindrical shell 26 which houses certain of my mechanisms for detecting irregularities in the surface configuration of checks. This cylindrical member 26 has a circular hole 27 therein through which checks are adapted to be fed to the configuration reading mechanism which will be presently described. The other end of this casing 26 has secured therein the circular plate member 28 by means of screws 29 penetrating the cylindrical member 26 and being threadably embedded into the plate member 28. This plate member 28 has a circular projecting portion 30, which extends through a hole in the plate 11. The tubular member 26 and the circular plate 28 secured therein are prevented from turning by means of a pin 31. Immediately within the hole 27 the cylindrical member 26 is enlarged for the rest of its length to a bore smaller than the disk 28, and slidably mounted in this bore is a tubular member 32 which has secured to the face portion thereof next to the hole 27 the disk 33 by means of screws 34 penetrating a disk 33 and being threadably embedded in the tubular member 32. This tubular member 32 has a plurality of longitudinally disposed grooves 35 and coinciding with these grooves 35 are a plurality of radially disposed grooves 36 on the front portion of the tubular member 32. A circumferential groove 37 is provided in which a ring member 38 is mounted, and on this ring member 38 are mounted the bell crank levers 39, there being one bell crank lever for each of the sets of longitudinal grooves 35 and radial grooves 36. Another circumferential groove 40 is provided in the tubular member 32, in which an endless tension spring 41 is mounted, said tension spring being adapted to press the bell crank levers normally to the position shown in Figure 8. Each of the bell crank levers 39 have the inwardly radially projecting portion 39a which are adapted to normally press against the inner heads of pins 42, said pins 42 being circumferentially arranged around the shaft 43 which will be later described. These pins 42 are slidably mounted in the plate 33, the operation of which will be later described. Slidably mounted within the tubular member 32 is another tubular member 44 which likewise has a plurality of longitudinally disposed slots 45 on the outside thereof similar to the slots 35 in the member 32. This member 44 has a circumferentially arranged slot 46, in which a ring 47 is mounted which serves as a pivot point for bell crank levers 50, which are mounted in the longitudinally disposed slots 45, and coinciding with the longitudinally disposed slots 45 are a like number of radially disposed slots 51, in which portion 50a of the bell crank levers 50 project. These portions 50a of the bell crank levers 50 are adapted to fit against the pins 52 which are slidably mounted in the plate 33 in the same manner as the pins 42. A second circumferentially arranged slot 53 is provided in which an endless tension spring 54 is mounted to normally press the bell crank levers 50 into normal position as shown in Figure 8. The member 44 has the thinner portion 55 on the rear thereof, on which is slidably mounted a hollow tubular member 56, said member 56 having a projecting ring 57 at the back portion thereof and having a circular hollowed out portion 58 in which a compression spring 59 is mounted, the other end of said compression spring fitting against an inside hollowed out portion 60 of the plate 28. The purpose of this tension spring is to normally force the member 56 to the left hand in Figure 8. On the inside of the member 44 there is a bore in which the shaft 43 is mounted, and a portion of this bore is enlarged as at 61, and a portion of the pin is enlarged as at 62, which enlarged portion is adapted to slide in the enlarged bore 61 and between the enlarged portion 62 and the base of the bore 61 is mounted a compression spring 63, which is mounted around the shaft 43, the purpose of said compression spring being to normally force the pin 43 into the position shown in Figure 8. This compression spring 63 also normally forces the member 44 forward against the plate 33, and said plate 33 being connected to the outer tubular member 32 also normally forces the tubular member 32 forward to the position shown in Figure 8. The shaft 43 although being adapted to occupy the normal position shown in Figure 8 is adapted to be pushed to the left in Figure 8 out through a hole 64 in the plate 33 to expel any undesirable check after it has been inserted into the coin entrance if the check should be desired to be withdrawn and not to be released to operate the check controlled apparatus.

The plate member 28 has a circular flange 65 therearound which is adapted to normally engage the free end of the bell crank levers 39, it being evident that when a suitable check is placed against the pins 42 that all of the bell crank levers can be raised which will cause the ends thereof to miss the circular projection 65 and will allow movement of the member 32 carrying the bell crank levers with relation to the projection 65, and in case a check is introduced into the coin entrance which will not press inwardly all of the pins 42 it will cause some of the bell crank levers 39 to fail to be raised and therefore will prevent the opening of the coin entrance by means of the disk 33 and associated parts moving backwardly to allow the coins to drop downwardly into the machine. The pins 52, if they are all depressed by the face of a check or coin, will cause the same to raise bell crank levers 50 outwardly at their free ends and to pass by the projection 57 and will allow the tubular member 44 to move with relation to the member 56 and will not move the member 56 at all. This member 56 has pivotally connected thereto as at 66 a circular member 67 which has an upwardly projecting arm 68 pivotally connected as at 69 in a member 70, which is secured in a suitable groove in the casing 26 by means of screw 71. It is therefore evident that if the check or coin should fail to raise all of the bell crank levers 50 that some of the bell crank levers will still engage the circular projection 57, and will move the member 56 backwardly which will carry with it the circular member 67, which will move the lower portion thereof, which is designated by the reference character 72, and which will operate the mechanism which will be presently described. The tubular member 32 has also secured therein a pin 73, which moves in slot 74 in the casing 26, and the function of pin 73 will be presently described. The member 72 which is a portion of the ring shaped member 67 is adapted to move in a slot 75, and it is shown in its most forward position in Figure 8, it being evident that the pivot point 69 and the casing 26 against which the portion 72 is resting in Figure 8 will prevent the parts from moving any further to the left than the position shown in Figure 8.

The member 44 has the shoulder 76 thereon against which an end of the member 56 is adapted to fit when the member 44 and associated parts is pushed backwardly, it being evident that the member 56 limits the movement to the right in Figure 8 of the member 44, disk 33 and associated parts. This limitation of movement is really performed when the ring member 57 is pushed all the way back to the right into the cavity 60 as shown in Figure 8. It is evident that when all of the bell crank levers 50 are operated that the shoulder 76 will move toward the left hand end portion of the member 56 but will not cause the member 56 to move any further to the right, but when any of the bell crank levers 50 engage the flange portion 57 it will carry this member 56 backwardly into the cavity 60 and still preserve the spacing between the shoulder 76 and the member 50. In the lower portion of the cylindrical member 26 I provide the passageway 77 and to the lower end of that I secure the coin chute 78 which is adapted to deliver the checks or coins into the rest of my apparatus.

Figures 9, 10:
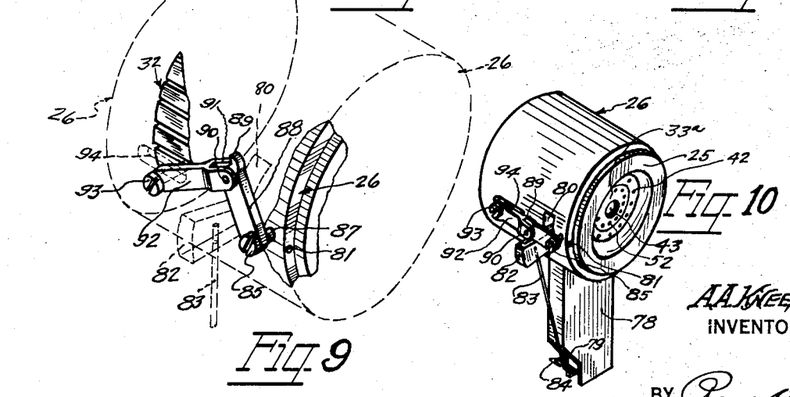
Figure 9 is a perspective view of the means for holding the coin entrance mechanism in opened position and for tripping the same.
Figure 10 is a perspective view similar to Figure 9 but on a smaller scale and showing the parts in a closed position.
Figures 18, 19, 20:
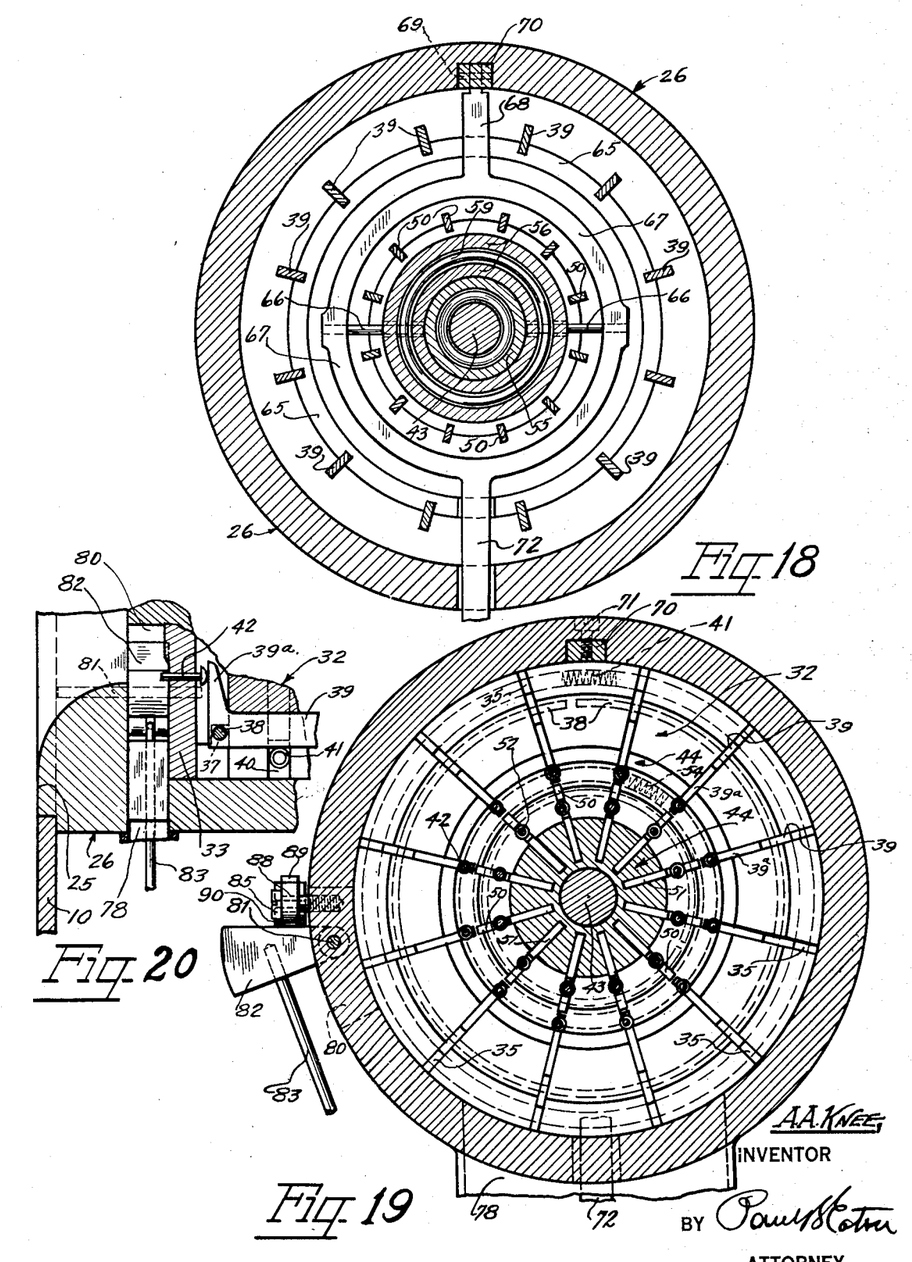
Figure 18 is a cross-sectional view taken along the line 18—18 in Figure 8.
Figure 19 is a cross-sectional view taken along the line 19—19 in Figure 8.
Figure 20 is an enlarged detail view of the lower left hand corner of Figure 8.

In order to keep the coin entrance in open position when the same has been opened by a suitable check for coin I provide a slot 80 in the side of the tubular member 26, and pivotally mount on a pin 81 a lever 82 which has a downwardly projecting arm 83 and the chute 78 has a cut away portion 79 therein, and the lower end of the arm 83 has a sidewardly projecting portion 84 which projects into the path of the falling check or coin as it falls through the chute 78. A pin or screw 85 is fixedly secured in the casing 26 and is spaced away from the casing 86 by means of a space washer 87, and on this screw 85 is pivotally mounted a portion of the toggle joint mechanism represented by the reference character 88. This member 88 has a tongue 89 on the end thereof and pivotally secured to the member 88 as at 90 is the forked end 91 of lever 92. The tongue 89 is adapted to move in the forked end 91 and to rest on top thereof when the same is in the position shown in Figure 10. The member 92 is pivotally mounted on screw 93 which pierces slot 94 in casing 26 and is embedded in the member 32, so as to slide therewith. It is thus seen that when the member 32 and associated parts is pushed backwardly that the toggle joint mechanism will occupy a straight line position or approximately below straight line in the central portion thereof as shown in Figure 10, and will hold the coin or check entrance in opened position, but when a coin or check falls downwardly through chute 78 it will engage the lower end of lever 83 as at 84, and will move the lever 82 upwardly and trip the toggle joint mechanism to the position shown in Figure 9 and will allow the coin or check entrance to be closed by the disk 33 and associated parts.

Pivotally secured on the pin 73 is the connecting link 100 which is pivotally connected as at 101 to the crank arm 102, which crank arm 112 is pivotally mounted as at 103 on the supporting member 104, which is secured to the casing 26 by means of screws 105. This crank arm projects laterally across the machine and has a pin 106 projecting upwardly therefrom on which a link 107 is slidably mounted, said link 107 having a hook 108 on its end, which is slidably mounted in a circular groove 109 in pin 106. This link 107 projects backwardly in the machine and is pivotally mounted as at 110 on a pin 111, which is secured on a projection 112 of a member 113, said member 113 being fixedly mounted on a main shaft A. This member 113 has a weight 114 at one end thereof with a stop 115 preferably covered with rubber or any other suitable material, and the other end of the member 113 projects upwardly and over toward the casing 26 and then projects downwardly to the point 116. Secured in the member 113 is a pin 117 on which is pivotally mounted a lever 118 which projects downwardly and has an off-set portion therein providing a hook 119, the purpose of which will be later described. The shorter portion of the member 118 has a T-shaped end designated by the reference character 118a, and from one end of the portion 118a is a laterally projecting portion 121 which projects above the member 113, and the other end of this portion 118a has a laterally projecting portion 122 which projects into the bend of member 113, the purpose of these portions 121 and 122 being to limit the movement of the lever 118 in both directions.

Pivotally mounted on the shaft A is the deflector operating member or bell crank lever 123 which has a barrel 124 integral therewith, with a bore 125 extending therethrough, through which bore 125 the shaft A is adapted to pierce. This barrel 124 and the lever 123 are pivotally mounted on the shaft A. Projecting rearwardly from the pivot point is a portion 126 of the lever 123, which has a weight 127 integral therewith. The other portion of lever 123 projects downwardly, and has an enlarged portion 128 in which an arcuate slot 129 appears and also an enlarged arcuate slot 130, and at the junction point of these two slots which are on the same arcuate line are notches 131 and 132, the purpose of which will be later explained. Just below the portion 128 there is secured to the member 123 a plate or vane 133, the purpose of which will be later described. Just below the point where the plate 133 is secured the member 123 makes an approximately right angle turn and projects forwardly, said portion being designated by the reference character 123a, and at the end thereof an upwardly projecting portion 123b appears, the purpose of which will be later described.

Fixedly mounted on the shaft A is the double crank member 134 which has pins 135 and 136 in the end portions thereof, and also projecting upward from the portion which has the pin 135 therein is an L-shaped pin 137, which has a right angle portion 138 which is adapted to operate in connection with the lever 139, which will be presently described. The lever 139 is fixedly secured in shaft D. The operation of shaft D will be later described. In the upper portion of the plate 11 the pin 140 is secured, which has a circular groove 141 therein, in which a loop 142 is adapted to slide, and said loop has the enlarged portion 143, which is adapted to pass on the outside of an arc described by the pins 135 and 136, so as to cause these pins to operate on the upper portion of the loop 143 at predetermined times. This loop portion 143 has integral therewith at the lower side thereof the portion 144 which is pivotally connected as at 145 to the arm 146, which arm is a part of the arm 147 which is fixedly secured on the shaft 148, which runs at a right angle to shaft A, but being disposed below shaft A at some distance. This shaft 148 is pivoted at its ends in the lugs 149a and 150a. Fixedly secured to the shaft 148 and projecting downwardly therefrom at the other end thereof from the point at which the lever 147 is secured is a lever 151, which projects downwardly and is adapted to open the balancing lever mechanism for the reception and discharge of a check, as will be presently described.

It has already been explained that lever 139 is fixedly secured in the shaft D, which shaft D is pivotally mounted in the side walls 10 and 11. This shaft D has mounted thereon a hook 152 which is adapted to support a stabilizer 153 which has a cross portion 154 intermediate its ends, and the lower end of the stabilizer is adapted to be held loosely in position by means of a hook 155, which is secured in a block 156 which is secured to the side wall portion 10. Also fixedly secured in the shaft D is a projecting arm 157 which is adapted to cooperate with an upwardly projecting arm associated with other mechanisms, which will be presently described. The shaft D also has a downwardly projecting arm 158 which projects downwardly and is adjusted, as to its backward movement by means of a set screw 159 in block 160, which is secured to the side wall portion 11.

Figures 26, 27, 28, 29, 30:
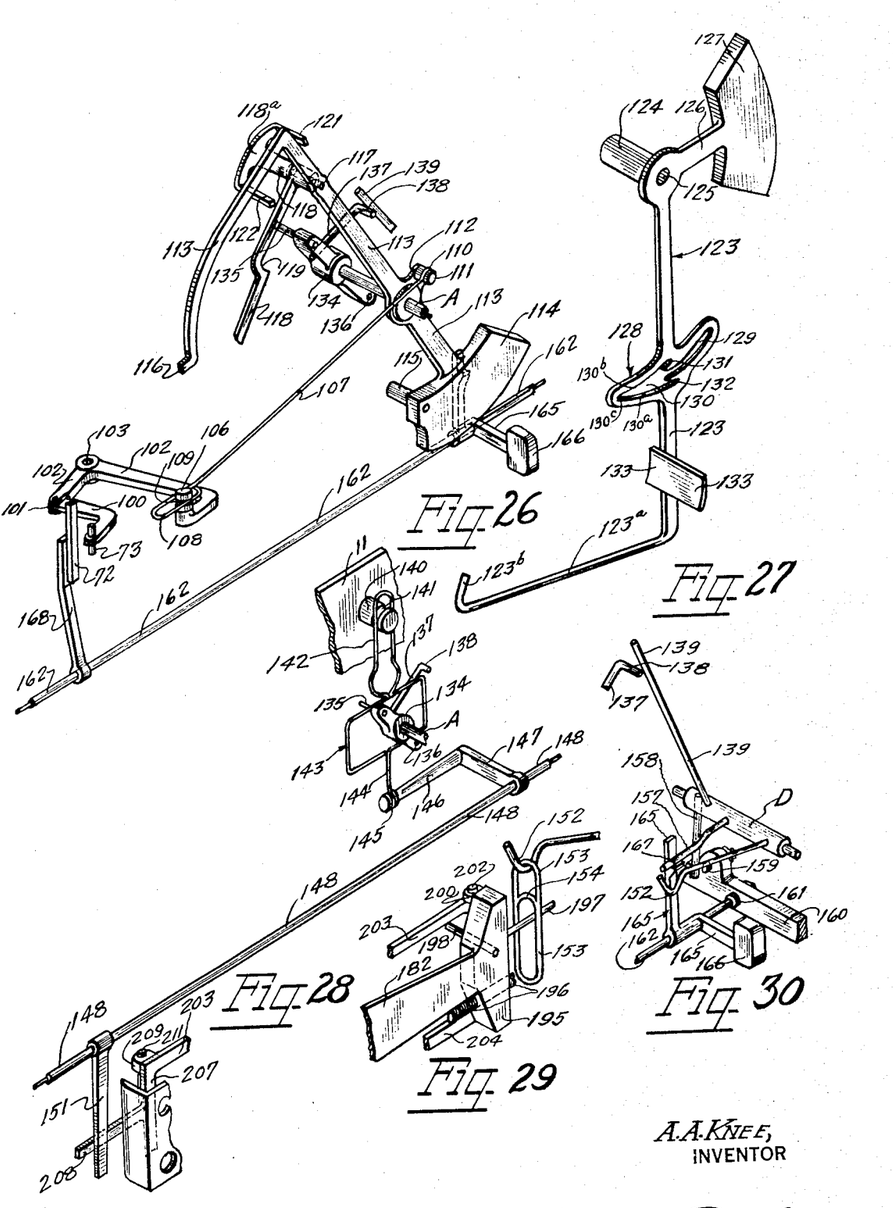
Figure 26 is a perspective view of a portion of the mechanism in the upper right hand corner of Figure 1 which is fixedly mounted on the main shaft.
Figure 27 is a perspective view of another portion of the mechanism which is pivotally mounted on the main shaft shown in Figure 26.
Figure 28 is a perspective view of a portion of the means for opening the coin receiving chamber in the balancing mechanism.
Figure 29 is a perspective view of the right hand portion of the balancing lever as shown in Figure 1 showing a part of the stabilizing means.
Figure 30 is a perspective view of the mechanism shown in the right middle portion of Figure 1, this being the means for releasing the stabilizing mechanism.

Pivotally mounted in this block 160 or rather in the screw 161 appearing in block 160 is a shaft 162 which projects through the machine to the other side thereof where it is pivotally mounted in the screw 163, which is mounted in the lug 164 on the side wall 11. A right angle lever 165 is fixedly secured on the shaft 162, and one end of this lever has a weight 166 thereon and the other end of this lever projects upwardly and has a notch 167 therein, which is adapted to engage the lever 157 projecting from shaft D, which holds the stabilizer in elevated position, as shown in Figures 29 and 30. Near the other end of the shaft 162 is an upwardly projecting arm 168 which is fixedly secured thereto, which projects upwardly in the path of the lever 72, which extends downwardly from the casing 26 as has been previously described.

Mounted in the side members 10 and 11 are adjustable bearings 170 and 171, and in these bearings a shaft B is rotatably mounted, and on this shaft B is fixedly secured a governor member 172. This governor 172 comprises an arm 173, which is L-shaped and at the tip of this L-shaped arm is a weight 174. Another arm projects from the hub portion of this member 172, and this arm is located at approximately an angle of 180 degrees from the arm 172. This latter arm is designated by the reference character 175, and has a weight 176 on the end thereof. This arm 175 also is L-shaped and is very similar to the arm 172. Also projecting from the hub portion of 172 is a counter-weight 177, which is adapted to return the governor to normal position after operation of the machine. Projecting from one side of the top portion of member 172 is a pin 178, which has a vane 179 secured in the end thereof, said vane projecting inwardly and bearing in close proximity to the shaft B. The purpose of this vane is to engage the lower end of member 118 and to deflect the same to cause the hook 119 to engage the lower end of the vane at the part where it goes around the pin 178 and holds the member 118 and associated parts in lowered position, for a moment, and the weight on the member 113, and also the weight 127 on member 123 causes the member 118 and associated parts to be raised upwardly and to move the governor a partial revolution until the lower end of member 118 strikes against the shaft B, and thus releases the hook 119 from vane 179, which allows the governor to return to normal position. This retarding movement is desired to give the balancing mechanism, which will be presently described, time to assume a position of rest, so that the member 123 which is retarded by the above described mechanism on account of weight 127 being held upward by pin 115 which causes the balancing mechanism to have time to assume a position of rest before the slot 129 moves forward to a point of engagement or coinciding with the balancing mechanism.

The slot 130 has the two edge portions 130a and 130b, edge 130a being so designed as to bring the balancing beam 182 and associated parts in balanced position when the pin 198 is resting in apex 130c of edges 130a and 130b, so that when a check of proper weight is passed into the balancing mechanism and when the lever 123 moves forward that pin 198 will register with slot 129.

These edges 130a and 130b are arcuate and are described from a different center so that when a check is inserted into the entrance and the member 123 is moved backward and the pin 198 is resting in apex 130c, the beam 182 will be in a proper position to coincide with slot 129, it therefore being evident that while in this position the check is received into the balancing mechanism so that the balancing mechanism cannot be moved by the impact of the falling check and if the check is of proper weight the balancing mechanism will not move as it will be in proper position as the member 123 moves forward, but if the check is below or above a given weight the pin 198 will move downwardly or upwardly and engage one of the notches 132 or 131 and prevent the deflector operator 123 from moving forward to operate the deflector 254 and associated parts.

My balancing or weighing mechanism, which is adapted to receive a check or coin from the chute, comprises a shaft C which is rotatably mounted in the bearing members 180 and 181 secured in the side wall portions 10 and 11. This balancing mechanism has a main member or beam 182 which is fixedly secured on the shaft C, and this beam member projects beneath the chute 78 and has the enlarged portion 183 which enlarged portion has the circular opening 184. Mounted above and below, and just to one side of the enlarged opening are the bearing projections 185 and 186, in which a shaft 187 is mounted for turning movement. This shaft 187 has fixedly secured near the central portion thereof an arm 188, and on the end of this arm is fixedly secured the feeler member 189. Fixedly secured on the shaft C is the leaf spring member 190 which is forked at its free end as at 191, and this fork 191 fits around and against the feeler member 189, the function of this spring being to normally press the feeler member inwardly against the check or coin. Secured to the lower portion of shaft or pin 187 is a stop wire 192, which projects backwardly beneath the balancing mechanism and is adapted at times to engage the plate 133 on member 123. Secured to the outer side of the main balancing beam 182 is a downwardly projecting guard 193, which has an eye 194 on the lower end thereof through which the stop wire 192 is adapted to pass, but in normal operation this stop wire is not supposed to touch the eye member. At the end of the beam 182, which has the guards which has just been described, is a weight portion 195 which has an adjusting screw 196 threadably mounted therein for the purpose of balancing the beam perfectly. Projecting from the upper outer surface of this weight member is a pin 197 which projects into the stabilizer 153 below the cross piece 154. On the other side of the beam which has just been described and projecting from the weight portion 195 is the pin 198 which projects normally into the slot 130, and when a coin or check is of proper weight it will register with the arcuate slot 129 in member 123, but when the coin or check is not of proper weight this pin will become engaged in one of the notches 131 or 132, and prevent the forward movement of the portion 123a of the member 123, which operates or fails to operate a deflecting mechanism which will be presently described. Even though the coin or check is of proper weight it will not coincide with the slot 129 due to the fact that if the coin or check is not of proper surface configuration it will fail to release the stabilizing mechanism by failing to move the shaft 162 to release lever 157 from the notch in the lever 165, and therefore will not lower the stabilizer mechanism to cause it to engage the pin 197, and will reject the coin or check for this reason.

Projecting from the same side of the weight member 195 from which the pin 198 projects are the bearing lugs 200 and 201 and in these bearing lugs is turnably mounted the pin or shaft 202.

Figures 4, 5:
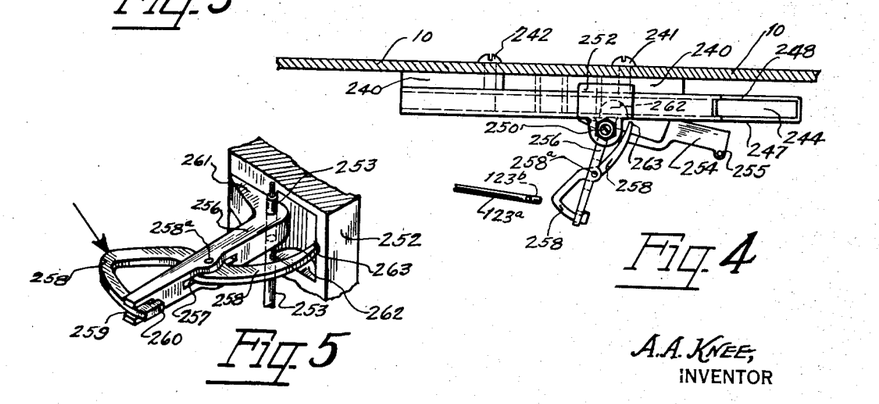
Figure 4 is an enlarged detail view looking downward on a portion of the chute for directing the checks into the check controlled apparatus or to the exterior of the machine.
Figure 5 is a perspective detail view looking from the lower right hand side of Figure 4.
Figures 6, 7, 31, 32:
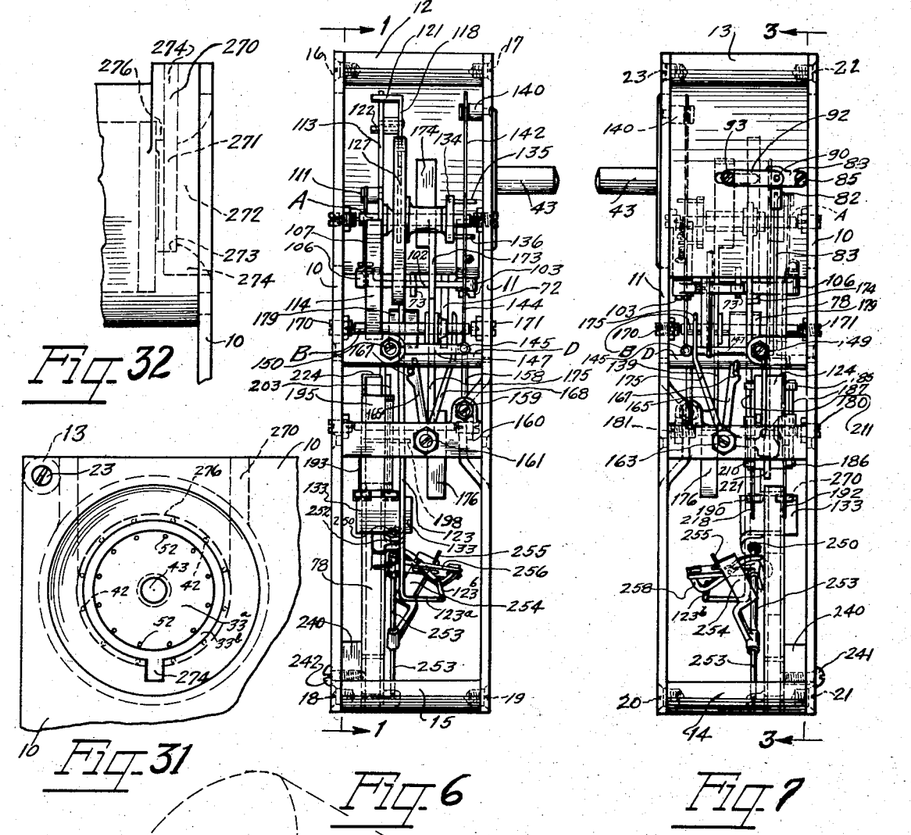
Figure 6 is an end view of my fraud preventive device looking from along the line 6—6 in Figure 1, and showing both side plates in position.
Figure 7 is a view of the opposite end from Figure 6 looking from along the line 7—7 in Figure 1, and showing both side plates in position.
Figure 31 is a front elevation of a modifier form of the coin entrance.
Figure 32 is a side elevation of Figure 31.
Figure 33:
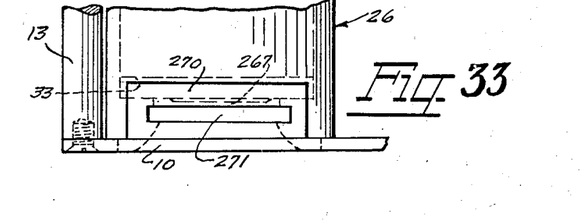
Figure 33 is a top plan view of Figures 31 and 32.

Fixedly secured on this pin or shaft are the arms 203 and 204 which are joined together by the barrel member 205 through which pin 202 passes forming a pivot point for the arms 203 and 204. The arms 203 and 204 are integral with the barrel member 205, and approximately midway between the ends of these arm members the cross piece 206 is integral with these arms to make a rigid structure. These arms 203 and 204 project forwardly beneath the coin chute or rather to one side thereof, and at the ends of these arm members the portion 207 is integral with these arm members, and the arm 208 projects further outwardly, said arm being integral with the cross piece 207. The projecting lugs 209 and 210 see Figure 7 are positioned at the junction point of the arms 203 and 204 and the cross piece 207, and through these projecting lugs a pin 211 is turnably mounted and intermediate the bearing lugs there is fixedly secured to this pin 211 the arm 212, see Figure 22 which has secured to the end thereof the feeler member 213 which projects inwardly to press against the central portion of the check or coin. A vertically disposed pin 214 is secured at the junction point of the feeler member 213 and the arm 212, and against this pin the fork 216 is adapted to press normally, said fork being on the end of leaf spring 217 which leaf spring is fixedly secured on the shaft C. Fixedly secured near the lower end of pin 211 is another stop member 218 which projects through the guide member 217, which is fixedly secured to the arms 203 and 204, and projects downwardly and has the guard 220 on the lower end thereof through which the stop member 218 passes. This stop member projects rearwardly and is adapted to engage the vane 133 in the same manner as the other stop member which has been previously described. Fixedly secured on the inside surface of the arms 203 and 204 near the free end thereof, is the guide member 221 which is bent backwardly over the arm 203 at the upper end thereof in order to form a directing surface for the coin or check as it leaves the chute 78 and passes into the balancing mechanism. This member 221 is secured to members 203 and 204 and has a vertically disposed slot 223 therein into which and through which the feeler member 213 is adapted to project under pressure of the leaf spring 216. The last named leaf spring not only presses the feeler member against the central portion of the coin or check, but it also presses the arms 203 and 204 inwardly which carries with said arms the member 221, which has just been described to cause it to press against the surface of the coin or check. At the end of the beam 182 in which the circular opening 184 appears the end of said beam is turned inwardly to form a vane 224 to serve as a guide for one edge of the coin or check. At the other edge of the enlarged portion 183 which is nearest to the pivot point of said beam, a guide member 225 is fixedly secured to direct and maintain the coin or check in position in association with the vane 224. Rearwardly of this last named guide member 225 and near the lower end thereof is mounted a pivot pin 226, on which is pivotally mounted a weighted lever 227 having a projection 227a, which is adapted to support the coin or check and prevent it falling through the beam until released. This weighted lever 227 is supported by a pin 228 and this weighted lever has a weighted portion 229 on the end thereof, and on the upper surface of this weighted portion 229 is a notch 230 in which lower portion 231 of bell crank lever 232 is adapted to normally rest, said bell crank lever 232 being pivotally mounted on pin 233, which pin is mounted in a projection 234 projecting upwardly from beam 182. This bell crank lever 232 has the fork 235 in the other end thereof which is adapted to be engaged by the hook 116 on the lower end of member 113 to raise this fork 235 upwardly which allows the lever 227 to be released by the portion 231 moving out of the path of portion 229, and its outer movement is limited by a pin 236, and the weight of the coin or check pressing on the portion 227a will raise the weighted portion 229 upwardly after the portion 231 of lever 232 has been moved out of its path against pin 236 to allow the coin or check to fall into the deflecting mechanism which will be presently described. Secured to the lower portion of side member 10 is a spacer block 240 and this spacer block is held in position by means of the screws 241 and 242. Secured to this spacer block by welding or any other suitable means is a lower coin directing member 243. This coin directing mechanism has a vertically disposed passageway 244, and an angularly disposed passageway 245. A triangular shaped block 246 is inserted between the side members 247 and 248 see Figure 4 which forms the portion of the deflecting mechanism. The coin or check chute 244 leads to the exterior of the machine to pass undesirable checks or coins back to the operator and the angularly disposed chute 245 is adapted to deflect coins into the coin or check operated machine with which this fraud preventive device is adapted to be associated. The path which a check or coin will travel, that is as to whether or not it will be deflected into the machine or returned to the operator is determined by my deflecting mechanism which comprises a bearing member 249, and a bearing member 250 which bearing member 250 is mounted in a lug 251 which projects laterally from an upstanding member 252 which is integral with the coin chute mechanism. Mounted in the just referred to bearing, is a shaft 253 which has fixedly secured thereon a deflecting member 254 which has a pin 255 in the free end thereof for limiting the inward movement of said deflecting member. Fixedly secured on the shaft 253 is a slotted L-shaped lever 256 which has a slot 257 therein, in which is pivotally mounted as at 258a an irregularly shaped pivoted lever 258. The free end of lever 256 is slotted as at 259 and the bent over portion of lever 258 which is indicated by the reference character 260 is adapted to slidably work in this slot in the end of said lever, and of course it is apparent that when this lever 258 is moved that this arrangement limits the movement of said lever 258 in one direction. The lever 256 has an arm 261 which is adapted to normally rest against the surface of lug 252. The lug 252 has a cavity 262 therein into which pointed end 263 of lever 258 is adapted to project when the portion 123b of lever 123 engages the lever 258 and causes the portion 260 to slide inwardly, which allows the portion 263 to clear the edge of the lug 262 and to travel in the said cavity. The lever 258 is adapted to normally assume the position shown in Figures 4 and 5 due to gravity, and in this position it is seen that the deflecting portion 254 is held in the position shown in Figure 4, so that when a coin or check is released from the balancing mechanism, said coin or check will fall straight downward through passageway 244 and be delivered to the exterior of the machine, which is not a desirable coin or check as the deflecting mechanism must be operated in order to deflect the coin or check into the passageway 245 and into the check controlled apparatus. The mechanism just described also serves as a safety mechanism to prevent the machine from being jarred to cause the deflector 254 to swing into the passageway 244. Member 123b strikes lever 258 and then strikes lever 256 to move the deflector 254 into chute 244. On Figures 31, 32 and 33 I have shown a slightly modified form of the coin entrance which is designed to engage the thickness of the coin or check before it is introduced into the coin slot proper. In this modified form I provide the cylinder 26 with an upwardly projecting portion 270 which has a slot 271 vertically disposed therein which delivers the coin or check in front of the plate 33, but at a distance in front of this plate sufficient for the coin or check to pass in front of the pins in said plate. A hole 272 is made slightly smaller than it is as shown in Figures 8 and 10, so as to prevent a coin being inserted into the device as it can be in the other form of my invention which has previously been described. In order for the coin or check to lie flush in front of the detecting and configuration detecting mechanism I provide a hollowed out portion 273 all the way around so as to cause the coin to rest in proper position. In Figure 31 I show a notch 274 for the purpose of inserting therethrough a pin or other suitable instruments for pushing the coin or check back upward through the coin chute in case it should become hung for any reason, and if it should be desired to remove the coin or check entirely from the machine. It is evident that in this form of the invention shaft 43 would be present, but it would not be necessary to have the projecting portion from the rear surface of the casing because this shaft 43 would not be used to expel the coin or check from the entrance. This shaft 43 however, would be desirable for pressing the coin or check forward into alinement with the slot 271 past the circular projection 276.

*Method of operation with genuine check or coin*

Figure 1:
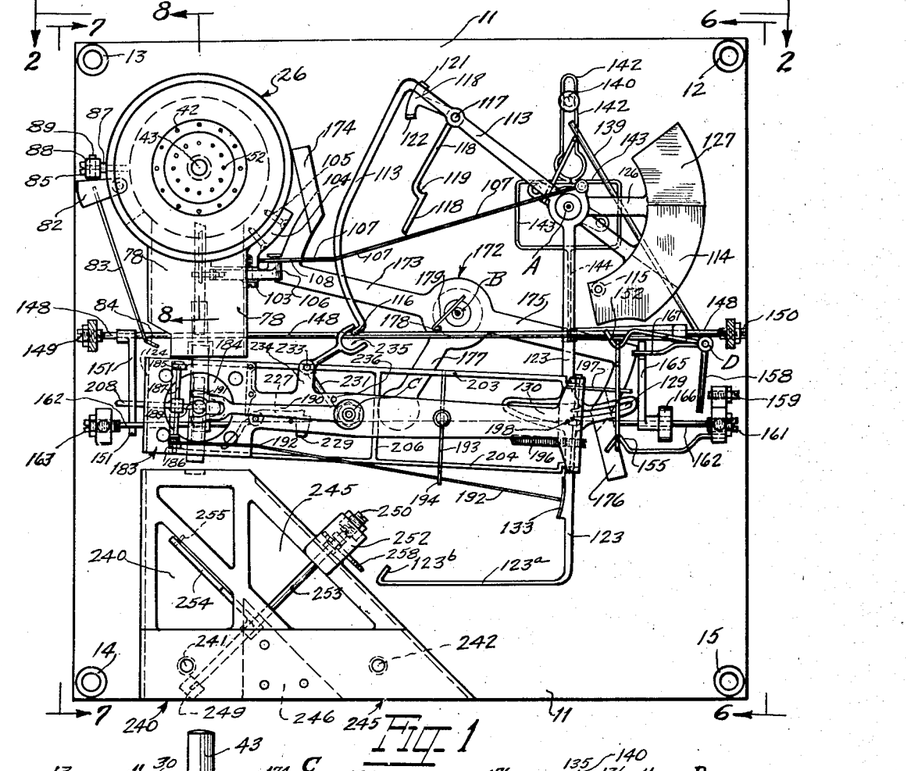
Figure 1 is a side elevation taken along the line 1—1 in Figures 2 and 6 with nearest side plate removed.
Figure 2:
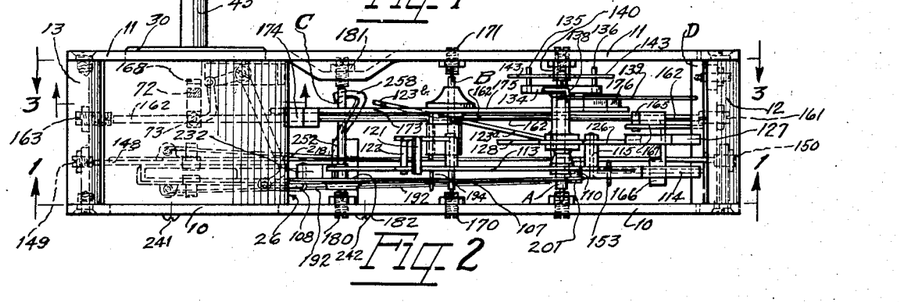
Figure 2 is a top plan view of Figure 1 taken along the line 2—2 in Figure 1 showing both side plates in position.
Figure 3:
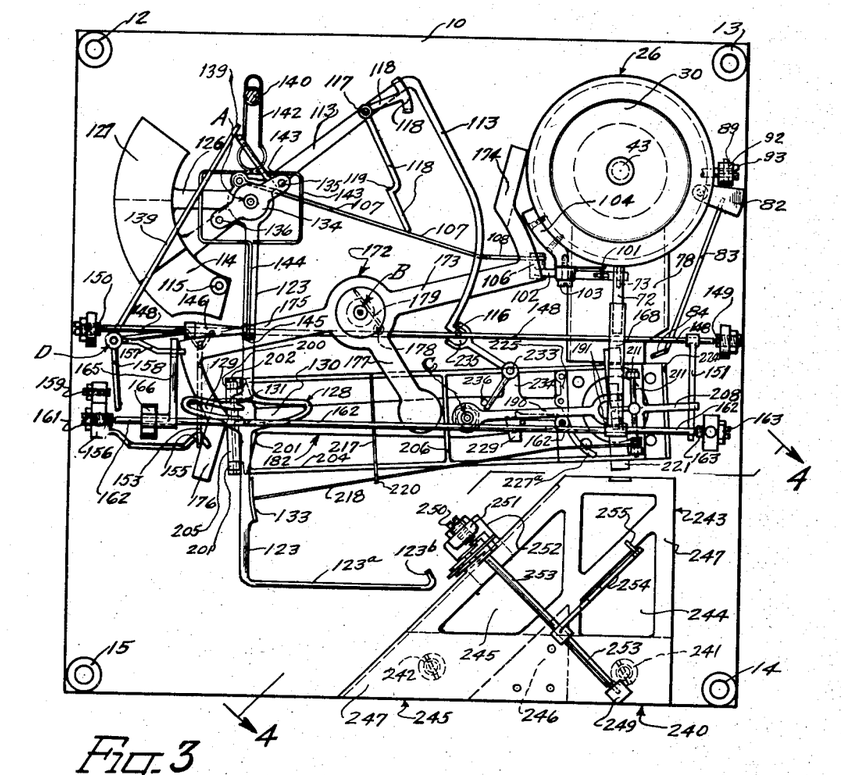
Figure 3 is a reverse side elevation from Figure 1 and taken along the line 3—3 in Figures 2 and 7 with nearest side plate removed.
Figures 21, 22, 23, 24, 25:
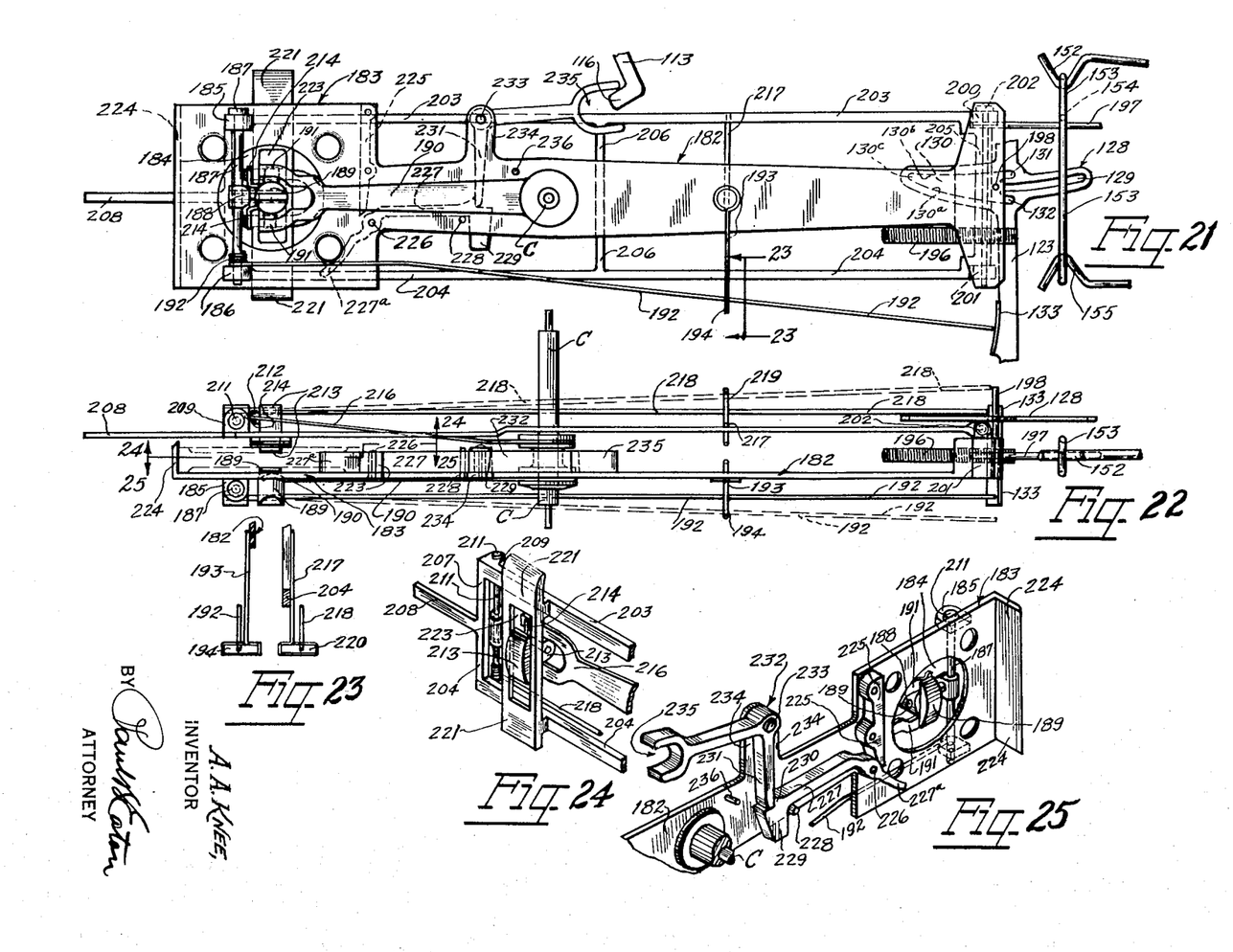
Figure 21 is an enlarged side elevation of the balancing lever and associated parts.
Figure 22 is a plan view of Figure 21.
Figure 23 is a cross-sectional view taken along the line 23—23 in Figure 21.
Figure 24 is a perspective view of the upper left hand corner of Figure 22.
Figure 25 is a perspective view of the lower left hand corner of Figure 22 looking at the same after the mechanism shown in Figure 24 has been removed.

I shall now proceed to describe the operation of my device when operated by a genuine coin or check. When a genuine coin or check is inserted into the coin entrance such a coin or check being of the type designated in Figure 11, which is an ordinary nickel or five cent piece in American money, the rim 300 will press all of the pins 42 and this will push inwardly the portions 39a of the bell crank levers 39 and will raise the other end of bell crank levers outwardly so that all of them will miss the circular projection 65 as shown in Figure 8. This will allow the member 32 and the plate 33 to slide in casing 26, and this will move pin 73 to the right in Figure 8, which will operate on the connecting rod 100, (Fig. 26) lever 102, rod 107 and will operate the lever 113 and associated parts, and this operation also will cause the projection 116 on the lever 113 to engage the fork 235, which is pivoted on the balancing lever and to return it to normal position as shown in Figure 25. At the same time the member 118 will move downwardly and hook 119 will become engaged with pin 178, and at the same time pin 136 moves upwardly and pin 135 moves downwardly (see Figure 28) and allows the loop 143 and associated parts to fall downwardly which causes the shaft 148 to have a partial revolution imparted thereto which allows the lever 151 to move slightly towards the observer in Figure 28, and this allows the portion 208 and portions 203 and 204 which carry the member 221 (see Figure 24) to move inwardly. This moving of lever 151 to allow the portion 208 and the coin feeling mechanism to press inwardly is occurring at the time the coin first is inserted into the coin entrance and while the pin 135 is moving downwardly which is an idle movement, but upon a further insertion of the coin into the coin entrance the shaft A is continued to be revolved by the mechanism 100, lever 107 and other parts, and this causes pin 136 to press against the upper right portion of loop 143 as shown in Figure 28, and will cause the lever 146 to be raised upwardly, and will cause lever 151 to press against projection 208 and to open the coin receiving portion of the machine to allow the coin as it falls downwardly into the balancing mechanism to be received in the balancing mechanism. When lever 113 is being returned to normal position by means of the weight 114, the members 208 and 221 again move towards the coin receiving member but at that time the coin has fallen into the receiving member and the feelers will engage the sides of the coin to spread the stop bars 192 and 218 outwardly to miss vane 133 on lever 123 and allow lever 123 to operate deflector 254. During further rotation of lever 113 on its return to normal position pin 135 will raise loop 143 and thus cause 208 and 221 to move away from the receiving member and move the feelers out of engagement with the sides of the coin. Then when 116 engages 235 to release arm 231 from notch 230, the coin is permitted to operate the lever 227 by its weight and drop upon the deflector. Figure 1 of the drawings shows the normal position of the various parts and this shows 157 resting in the notch 167 and thus held from moving downwardly. When lever 113 is operated by the insertion of a coin, it moves away from member 139 but shaft D is restrained from movement by arm 157 engaging notch 167. If the coin is genuine, member 165 on shaft 162 is moved to release arm 157 and allow the stabilizing mechanism to be lowered. When lever 113 returns to normal position, extension 138 engages arm 139, thus turning shaft D and causing arm 157 to be raised so as to again engage notch 157. The lever 158 will abut against set screw 159 which will place the stabilizing member 153 in proper position, and allow the pin 197 in the balancing mechanism to engage the cross portion 154 of the stabilizer to stabilize the genuine coin when it is dropped into the balancing mechanism. When a genuine coin is dropped into the balancing mechanism the feeler members 213 and 189 will engage the raised portion in the central portion of the check, and this will cause the stop bars 192 and 218 to spread outwardly to the dotted line position shown in Figure 22, and will cause them to miss the vane 133 on lever 123, and allow this lever 123 to move inwardly, and this being a genuine check the pin 198 will coincide with the slot 129 and this will cause the projection 123b to hit against the lever 258 and press it inwardly to cause the point 263 to miss the projection on which it would normally come in contact, and to project into the cavity 262 and this allows lever 256 to move which gives a partial rotation to rod 253, which causes the deflecting member 254 to travel into passageway 244 and deflect the coin or check into the passageway 245 which leads to the check controlled apparatus.

*Method of operation with a check similar to that shown in Figures 12 and 15*

In the description which has just been given as to the method of operation with a genuine check or coin such as that shown in Figure 11, it might here be stated that with all kinds of checks the first part of the operation is the raising outwardly of some or all of the crank arms 39. If a check is produced which will not raise all of these arms 39 outwardly then the coin entrance will not be opened at all and no operation will take place, but in all of the various kinds of checks shown in my drawings the outer crank arms will be operated to open the check entrance as the outer periphery of the check is of such a configuration as to operate all of the crank arms 39 to allow the plate 33 to open. It is not thought necessary to explain against the operation of parts controlled by the opening of the plate 33 and the member 32 which is carried thereby. This operation will take place in all instances, in which checks such as those which are shown in the drawings are used. When a check is used similar to that shown in Figures 12 and 15 then not only will all of the outer crank arms 39 be moved to allow them to pass by the circular projection 65 in Figure 8, but also all of the crank arms 50 will also be moved outwardly at their free ends to allow the same to pass by the projection 57, and if all of these crank arms 50 pass by the projection 57 then the member 56 will not be moved, and the lever 72 projecting therefrom will not be moved and as this lever 72 (see Figure 26) controls the releasing means for the stabilizer mechanism, then it is evident that the stabilizer mechanism which is returned to a raised position by the returning of the parts to normal position when the preceding check or coin passes through the machine will not be released when the check is passed on to the balancing mechanism, the stabilizing mechanism being in elevated position, and not being released by movement of lever 72, and not being in operation will cause the balancing beam to fail to come to a position of rest quickly enough and will be tilted too much or not enough or the pin 198 will engage the upper notch 131 or the lower notch 132, and the lever 123 will not be allowed to move forward to move the deflecting member 254, and this will mean that the check or coin will drop straight downwardly in the passageway 244 and be returned to the operator. It is thus seen that even though the check should be of given weight if it does not operate the crank arm 168 to release the stabilizer mechanism, then the balancing beam will move up and down in rapid succession and will not come to a position of rest in time to deflect the coin into the machine for the reason that the chances would be very, very small of pin 198 coinciding with the slot 128 while it was moving up and down, before the coin is dumped from the balancing mechanism.

The check shown in Figures 13 and 17 would operate in exactly the same manner as the check shown in Figures 12 and 15, because both forms of the check would operate all of the pins and all of the crank arms to operate as has been described for the check shown in Figures 12 and 15.

The operation of the mechanism when a check is dropped thereinto as has been described for Figures 12 and 15 would be the same for a check such as is shown in Figures 14 and 16, as the outer rim would operate all of the outer pins and crank arms and the inner surface being smooth would operate all of the inner pins and crank arms, and cause it to operate in the same manner as has been described for the check as shown in Figures 12 and 15. Likewise when a check is used such as shown in Figures 13 and 17 the operation would be the same as for a check such as shown in Figures 12 and 15, due to the same reason of the smoothness of the face of the check, as has been previously described.

In the Figures 11 to 17 it will be noted that dotted lines appear, the outer dotted lines being designated by the reference character 301 and the inner dotted line being represented by the reference character 302. These dotted lines indicate that the dotted line indicated by the reference character 301 is the point on the check at which the outer ring or pins 42 will engage the check or coin, and the inner ring 302 denotes the point at which the inner ring of pins 52 will engage the check or coin.

It might be noted in this connection that the disk 33 has the raised central portion 33a against which the inner portion of the coin or check is adapted to fit while the outer or rim portion 300 such as shown in Figure 11, is adapted to fit into the lower portion 33b of the disk 33. The purpose of the arrangement of the raised portion 33a is to cause the machine to reject a check such as shown in Figure 16, in which case it is seen that the outer edge 300 will depress all of the pins 42 and the inner surface 303 will depress all of the inner pins 52, and if this arrangement were not present then the portion 300 would hold the surface 303 away from the pins 52 unless they projected out to a very substantial distance which would interfere with the operation of this machine, but by making the enlarged portion 33a project outwardly to fit a check of this nature, it causes the machine to reject it in two ways where without this arrangement, it would reject it only by the fact that the outer pins would all be forced out, and also the inner pins would be forced out and cause lever 72 to fail to operate.

It has already been described as to the operation of the stop bars 218 and 192 when a genuine check or coin such as shown in Figure 11 is inserted into the machine and passed on to the balancing mechanism. It was there seen that the stop bars would be held in open position as shown by the dotted lines in Figure 22. It is therefore evident that when a check or coin such as is shown in Figure 16 is dropped into the balancing mechanism that the feeler members 213 and 189 would press into the hollowed out portion 303 and this would not spread the stop bars 218 and 192, but would cause the stop bars to assume the position shown in bold lines in Figure 22. These stop bars not being spread out at their free ends will engage the vane 133 on lever 123 as the same swings forwardly, and this will prevent the portion 123b from engaging the lever 258 to operate the deflector 254, and since deflector 254 will not be operated then the check or coin would be dropped straight downwardly in passageway 244 and returned to the outside of the machine. These feelers measure the relative thickness of the center of the check as compared with the rim portion of the check.

In the drawings and specification I have set forth a preferred embodiment of my invention, and although specific terms are employed, they are used in a generic and descriptive sense only, and not for purposes of limitation, the scope of the invention being set forth in the appended claims.

I claim:

1. In a fraud preventive device for check controlled apparatus, a selector mechanism including a balancing mechanism, means for guiding a check to said balancing mechanism, means in said balancing mechanism for measuring the thickness of a check deposited therein, and means controlled by said balancing mechanism and by said thickness measuring means associated with said balancing mechanism for determining the disposition of the check after leaving the balancing mechanism.

2. In a fraud preventive device for check controlled apparatus, a check entrance, surface detecting means in said check entrance for allowing said check entrance to open upon the insertion therein of a predetermined check, other surface detecting means in said check entrance, a balancing mechanism adapted to receive checks after passing through said check entrance, a coin support in the balancing mechanism means associated with said balancing mechanism and having conections with the said second surface detecting means and being controlled by said second surface detecting means to determine the disposition of the check after leaving said balancing mechanism, and means associated with said balancing mechanism for gauging the relative thickness of the central portion of the check with relation to the outer portion thereof, deflecting means for determining the path of the check after leaving said balancing mechanism, deflector operating means, said deflector operating means being controlled by the measuring means in said balancing mechanism and means whereby the first surface detecting means controls the coin support in the balancing mechanism.

3. In a fraud preventive device for check controlled apparatus, means for detecting the surface configuration of a check at a plurality of points, means for weighing said check after the same has passed the detecting operation, means associated with the said weighing means for measuring the thickness of said check, means for measuring the size of said check, and means operated and controlled by all of said surface detecting means by said measuring means, and the weighing means for determining into which of two places a check shall pass after passing through the above mentioned means.

4. In a fraud preventive device for check controlled apparatus, a check entrance, a balancing mechanism adapted to receive checks from said check entrance, a coin support in said balancing mechanism, stabilizing means for controlling said balancing mechanism, a deflector for deflecting the check after it is released from the balancing mechanism, deflector controlling means associated with said balancing mechanism, check surface detecting means for permitting opening of the check entrance if the check is genuine, other check surface detecting means for controlling the stabilizing means, thickness measuring means associated with said balancing mechanism and being adapted to cooperate with the deflector operating mechanism, and cooperating means in said balancing mechanism and said deflector operating means for allowing the deflector operating means to operate said deflector when a check has successfully passed both surface detecting means in the check entrance, the surface balancing mechanism for gauging the thickness of the central portion of the check with relation to the thickness of the edge portions of the check, and having means for controlling the deflector operating mechanism, means operable by the insertion of a check for allowing the closing means to be moved to opened position, means for holding the check entrance in open position, means for allowing the closing means to move to closed position when the check has passed through the check entrance, other means in said check entrance operable by the insertion of the check therein for controlling the stabilizing mechanism, and means for causing said deflector operating means to remain in inactive position when the said other means in the check entrance are not operated.

14. In a fraud preventive device for check controlled apparatus, a check entrance, means for closing said entrance, means operated by the outer edge of the check for permitting the closing means to be moved to open position, means for holding the closing means in open position operable by a check to permit the closing means to move to closing position, means adapted to be operated by another portion of said check for operating other means in said check entrance, stabilizing means, connections between said stabilizing means and said other means in said check entrance, means for utilizing the energy expended in opening said check entrance to operate the fraud preventive device, a balancing mechanism associated with said stabilizing means, a check receptacle in said balancing mechanism, means associated with said check entrance for opening said check receptacle in said balancing mechanism and for closing the same to hold the check and open the same to allow said check to fall out of the balancing mechanism, a deflecting mechanism mounted below the balancing mechanism, deflector operating means, feelers in said balancing mechanism for measuring the relative thickness of the central portion of a check with relation to the outer portion, means associated with said feelers for governing the deflector operating means, retarding means for said deflector operating means, means for releasing said check from said check receptacle in said balancing mechanism, said deflector being adapted to be operated only when said second means in said check entrance are operated, and said feeler means in said balancing mechanism permit said deflecting operating means to move forward to operate the deflector controlling means.

15. In a fraud preventive device for check controlled apparatus, having a check entrance, means for normally closing the check entrance, means in the closing means for testing the configuration of a check, balancing means, check supporting means in the balancing means controlled by the configuration testing means, a stabilizer associated with the balancing mechanism and being controlled by the configuration testing means, a deflector for deflecting the checks, a pair of chutes, and means controlled by the balancing mechanism for operating the deflector.

16. In a fraud preventive device for check controlled apparatus, deflecting means for guiding a check into the check controlled apparatus, and means operable by the surface configuration of a check and means operable by the weight of the check and means operable by the relative thickness of the central portion of the check with relation to the peripheral thickness of the check for independently controlling said deflecting means.

17. In a check controlled apparatus, a balancing mechanism adapted to receive a check and weigh the same, means for holding the balancing mechanism in balanced position while the check is received thereinto, stabilizing means normally disengaged from the balancing mechanism, means for supporting the stabilizing means independently of the stabilizing means, means in the balancing mechanism for engaging the stabilizing means when a check above a given weight is received by the balancing mechanism.

18. A fraud preventive device for check controlled apparatus, comprising a plurality of surface configuration reading means for the check, weighing means for said check, deflecting means for said check, means for actuating the deflecting means, means operable independently by each of the means above enumerated for controlling said means for actuating said deflecting means to deflect the check, if genuine, into the check controlled apparatus.

19. In a fraud preventive device for check controlled apparatus, means for deflecting a check into or out of the apparatus surface configuration reading means, weighing means, means for gauging the relative thickness of the central portion of the check with relation to the peripheral thickness, and means independently operable by all of said means for selective operation of said deflecting means to deflect the check into the check controlled apparatus only when genuine.

20. In a fraud preventive device for check controlled apparatus, a balancing mechanism, means operable by the insertion of a check into the device to bring the balancing mechanism to a balanced position and for holding the balancing mechanism in a balanced position while the check is received into said balancing mechanism, stabilizing means associated with said balancing mechanism, means for holding the stabilizing means in inactive position and means operable by an inserted check for releasing the holding means to cause said stabilizing means to be engaged by the balancing mechanism.

21. In a fraud preventive device for check controlled apparatus, having a check entrance, a balancing mechanism, a deflector mechanism for deflecting checks into the check controlled apparatus, a stabilizing mechanism associated with the balancing mechanism, deflector operating means associated with said balancing mechanism, means for normally holding the deflector operating means in inoperative position, means in said balancing mechanism for normally rendering said deflector operating means inoperative, means in said check entrance operable by the configuration of the side of an inserted check for controlling the means for holding said deflecting operating means in inoperative position, means in said balancing mechanism adapted to operate upon each side of a check to control the deflecting operating means, and means for holding said balancing mechanism in adjusted position while a check is dropped into said balancing mechanism.

22. In a fraud preventive device for check controlled apparatus, having an entrance, means in said entrance operated by the configuration of a check, a deflecting mechanism for deflecting a check in one or two directions, a balancing mechanism, a deflector operating mechanism, means controlled by said means in said entrance for controlling the deflector operating means, cooperating means between said balancing mechanism detecting means in the balancing mechanism, and the balancing mechanism proper, said coin support being controlled by the first check surface detecting means.

5. In a fraud preventive device for check controlled apparatus, means for deflecting a check into the check controlled apparatus if genuine, configuration measuring means for engaging the surface of a check, means operable by the configuration measuring means for allowing the check to enter the device, other configuration measuring means for engaging another portion of the surface of the check, balancing means for weighing the check, means for operating said deflecting means, connections between said deflecting means and the said other configuration measuring means for permitting the deflecting means to operate only when the check has conformed to the requirements of the other configuration measuring means, and means on the balancing means for also controlling the deflecting means.

6. In a fraud preventive device for check controlled apparatus, a deflector for deflecting checks, if genuine, into the check controlled apparatus, surface feeling means, weight determining means, other surface feeling means, means for operating said deflector, said operating means being actuated by said surface feeling means and controlled by said other surface feeling means and said weight determining means.

7. In a fraud preventive device for check controlled apparatus, means for determining the admissibility of the check into the fraud preventive device, weight determining means, means for determining relative thickness of two portions of a check, surface reading means, deflecting means for deflecting the check if it successfully passes the desired thickness, weight, and surface reading means, deflector operating means associated with said thickness determining means, said weight determining means and surface reading means having means to control said deflector operating means to permit said deflector operating means to operate said deflector to deflect the check into the check controlled apparatus if the configuration of said check is such as to properly position said thickness determining means, weight determining means and surface reading means.

8. In a fraud preventive device for check controlled apparatus, weighing means, means for measuring the relative thickness between two portions of the surface of a check, configuration reading means, a second set of configuration reading means, a deflector for deflecting genuine checks into the check controlled apparatus, stabilizing means for said weighing means, deflector operating means, means operable independently by the measuring means, weighing means, and configuration reading means for controlling the deflector operating means.

9. In a fraud preventive device for check controlled apparatus, having a check entrance, means for closing the check entrance, means for holding the closing means in normally closed position, a balancing mechanism, a chute leading from said check entrance to the said balancing mechanism, a stabilizer associated with said balancing mechanism, means in said check entrance for permitting a check of a given configuration to open said entrance, means for holding said check entrance in open position, means releasable by said check for closing said entrance, means in said check entrance for controlling said stabilizing means, means for deflecting checks into the check controlled apparatus, and means controlled by said balancing mechanism and said stabilizing mechanism for selective operation of said deflecting means.

10. In a fraud preventive device for check controlled apparatus, having a check entrance, means for normally closing said check entrance, means for holding the closing means normally in closed position, means in said check entrance operable by the configuration of a prescribed check to permit opening of said check entrance, other means in said check entrance operable by a check of a given configuration, weighing means, stabilizer mechanism associated with said weighing means, connections between said stabilizer mechanism and the said second configuration testing means in said check entrance for controlling said stabilizing mechanism, deflecting means for deflecting a check into the check controlled apparatus, means for causing said deflecting means to remain inoperative unless said check is of a configuration of such a character as to release said stabilizing mechanism.

11. In a fraud preventive device for check controlled apparatus having a check entrance, means for closing the entrance, means for holding the closing means normally in closed position, a balancing mechanism, a stabilizing mechanism associated with said balancing mechanism, a deflector for deflecting checks into the check controlled apparatus, deflector operating means controlled by said balancing mechanism, means associated with said balancing mechanism for determining the relative thickness of two portions of the check, means in said check entrance operable by the configuration of a check for controlling the opening of the same, and other means in said check entrance operable by the configuration of the check for controlling said stabilizing means, and means actuated by said thickness determining means for controlling said deflector operating means.

12. In a fraud preventive device for check controlled apparatus having a check entrance, means for closing the entrance, means for holding the closing means normally in closed position, means operable by the insertion of a check in said entrance for allowing the opening of the check entrance, other means operable by the configuration of said check to determine in which of two directions the check will pass out of the fraud preventive device, balancing mechanism, a stabilizer mechanism associated with said balancing mechanism, means in said balancing mechanism adapted to receive the check after it passes through the check entrance, a deflector mechanism for deflecting checks into the check controlled apparatus, means for guarding said deflector, means for operating said deflector, cooperating means on the deflector operating means and the balancing mechanism for permitting said deflector to operate if the check is genuine, and means controlled by said other means for determining the position of said stabilizing means.

13. In a fraud preventive device for check controlled apparatus having a check entrance, means for closing the check entrance, means for holding the closing means normally in closed position, a balancing mechanism, means for conducting a check from said check entrance to said balancing mechanism, a stabilizing mechanism associated with said balancing mechanism, a deflector for deflecting coins into the check controlled apparatus, deflector operating means, means in said and said deflecting operating mechanism for allowing relative movement between the two if the check is of proper weight, said deflector operating means being operable only when the surface configuration of the check is proper and the weight of the check is proper to allow the deflector operating means to move with relation to the balancing mechanism to operate the deflector to deflect the check into the check controlled apparatus.

23. In a fraud preventive device for check controlled apparatus, a balancing mechanism, means in said balancing mechanism for measuring the relative thickness of the central portion of the check with relation to the peripheral thickness thereof, a deflector adapted to deflect said check in one of two directions after passing out of the balancing mechanism, deflector operating means, means controlled by said balancing mechanism for controlling the deflector operating means, and means controlled by said thickness reading means for controlling said deflector operating means.

24. In a fraud preventive device for check controlled apparatus, surface configuration reading means, weighing means, deflecting means, and means controlled by said configuration reading means and weighing means for actuating said deflecting means to deflect a check into the check controlled apparatus if genuine and to return the check to the exterior of the device if not genuine.

25. In a fraud preventive device for check controlled apparatus, a balancing mechanism, means associated with said balancing mechanism for measuring the relative thickness of a check with relation to the central portion and its peripheral portion, means controlled by said balancing mechanism and by said thickness measuring means for determining the disposition of the check after leaving the balancing mechanism.

26. In a fraud preventive device for check controlled apparatus, means for detecting the surface configuration of a check at a plurality of points, means for weighing said check after the same has passed the detecting operation, means associated with the said weighing means for measuring the relative thickness of the peripheral and central portions of said check, and means for measuring the size of said check, and means operated and controlled by all of said surface detecting means, weighing means, and thickness measuring means for determining into which of two places a check shall pass after passing through the above mentioned means.

27. In a fraud preventive device for check controlled apparatus, a deflector for deflecting checks if genuine into the check controlled apparatus, surface feeling means, weight determining means, other surface feeling means, means for actuating said deflector, means operable by the other surface feeling means for controlling the means for actuating said deflector and means operable by said weight determining means for controlling the means for actuating said deflector.

28. In a fraud preventive device for check controlled apparatus having an entrance, means in said entrance for detecting unevenness of the surface configuration of a check, means for weighing said check after the same has passed thru the said entrance, means associated with said weighing for measuring the relative thickness of a check as to its central portion and its peripheral portion, check directing means located beneath the balancing mechanism, means associated with said surface configuration reading means for operating the directing means, and means in said balancing mechanism for controlling the directing means.

29. A check testing apparatus having a plurality of means for testing the facial configuration of a presented check, means for testing the thickness of a presented check, and means controlled independently by each of said means for disposing of said check as it leaves the check testing apparatus.

30. Coin selecting apparatus including mechanism comprising a balance frame oscillatory for gauging the weight of a deposited coin, in combination with mechanism comprising coin shiftable members mounted on the balance frame for simultaneously gauging the thickness of the coin.

31. Coin selecting apparatus comprising, in combination, means for simultaneously gauging the weight and thickness of a coin, coin distributing means, and mechanism for actuating the distributing means during the gauging of the coin.

AARON A. KNEE.